United States Patent [19]
Bowers et al.

[11] 3,865,419
[45] Feb. 11, 1975

[54] UNIVERSAL BATTERY LIFTER

[75] Inventors: Bernard P. Bowers, Ontelaunee Twp., Berks County; Delight E. Breidegam, Jr., Kutztown, both of Pa.

[73] Assignee: East Penn Mfg. Co., Inc., Lyon Station, Pa.

[22] Filed: Nov. 30, 1973

[21] Appl. No.: 420,368

[52] U.S. Cl. ............... 294/63 B, 294/92, 204/103
[51] Int. Cl. .............................................. B66c 1/12
[58] Field of Search............ 294/2, 63 B, 74, 89, 92, 294/103; 16/114 R, 118, 119; 24/73 R, 73 SP, 105, 155 T, 221 R, 265 R, 265 CD; 136/181; 224/45 F, 49, 50, 55

[56] References Cited
UNITED STATES PATENTS

| | | | |
|---|---|---|---|
| 1,267,659 | 5/1918 | Gries | 294/63 B X |
| 1,529,518 | 3/1925 | Voeller | 16/114 R X |
| 2,175,632 | 10/1939 | Maga | 16/114 R |
| 2,503,794 | 4/1950 | Brown | 294/63 B X |
| 2,609,761 | 9/1952 | Clark | 25/265 CD X |
| 2,967,730 | 1/1961 | Vann | 294/92 X |
| 3,175,862 | 3/1965 | Robbins | 24/265 AL X |
| 3,522,646 | 8/1970 | Sibthorp | 24/73 SS X |

Primary Examiner—Evon C. Blunk
Assistant Examiner—Johnny D. Cherry
Attorney, Agent, or Firm—Zachary T. Wobensmith, 2nd; Zachary T. Wobensmith, III

[57] ABSTRACT

A battery lifter is provided, particularly suited for automotive use comprising battery terminal engaging devices with a connector such as a strap for manual engagement by the user, the battery terminal engaging devices being suitable for engagement as required with upright post terminals employed on certain types of batteries or with the internally threaded terminals located on a side wall of other types of batteries.

2 Claims, 5 Drawing Figures

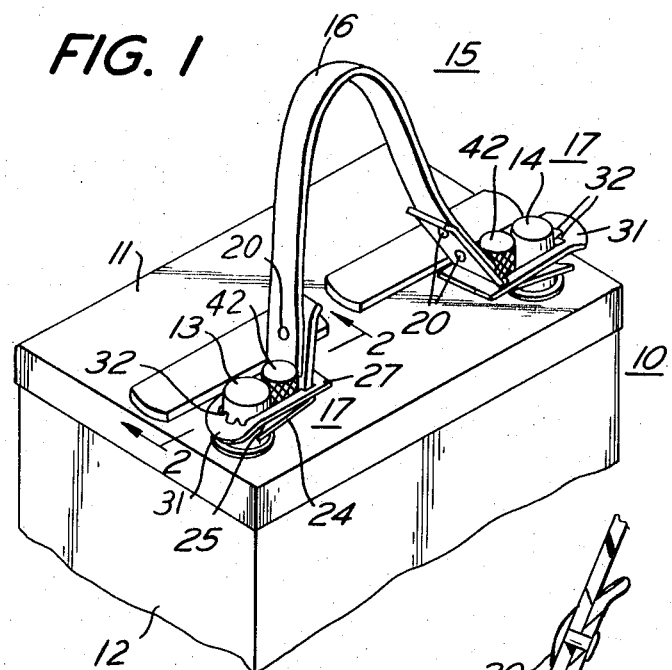
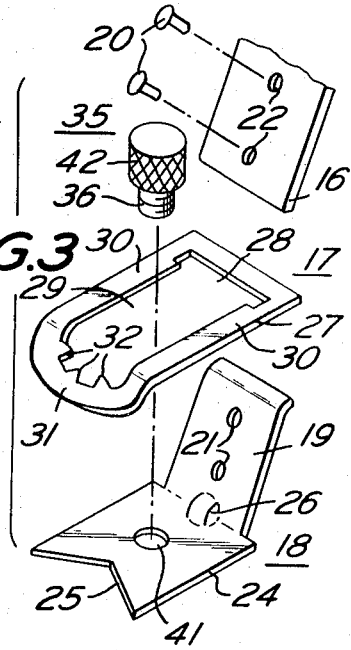
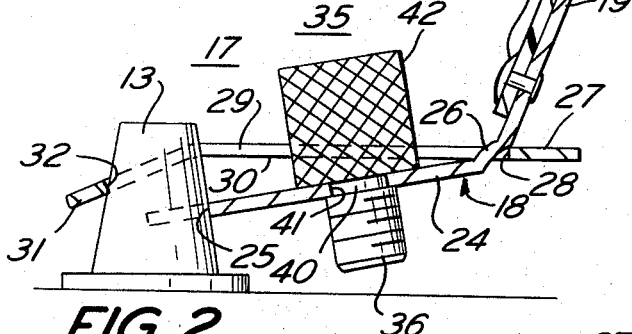
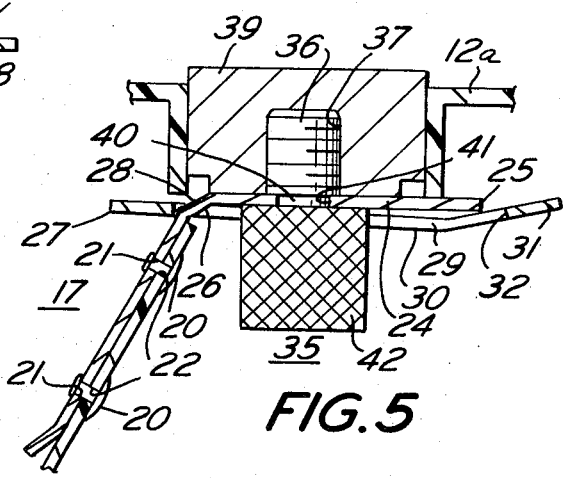
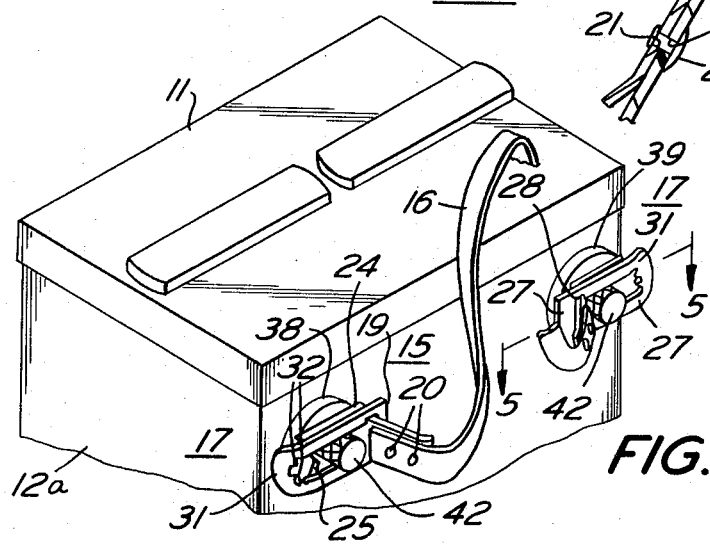

UNIVERSAL BATTERY LIFTER

BACKGROUND OF THE INVENTION

1. Field of the Invention

This invention relates to battery lifters for removal of a battery from an automotive or other vehicle and for readily moving the battery from place to place.

2. Brief Description of the Prior Art

It has heretofore been proposed as in U.S. Pat. No. 2,503,794, to provide battery lifting devices for storage batteries having spaced upright post terminals which include two piece self adjusting grips or clamps, one of the jaws of which is pivoted with respect to the other, the grips or clamps being connected by rivets to the ends of a strap of duck or plastic which is not electrically conductive. These lifting devices are limited to use with batteries having upright post type terminals.

It has also heretofore been proposed to provide a battery carrying strap having knurled screws in a fixed plate at each end for engagement of the screws in internally threaded terminals located on a side wall of a battery. These lifting devices are limited to use with that specific type of battery.

SUMMARY OF THE INVENTION

In accordance with the invention a battery lifter is provided having battery engaging elements at the end of a connector which are selectively engageable with the upright post terminals on the top of one type of battery or with the internally threaded terminals in the side wall of a different type of battery.

It is the principal object of the invention to provide a battery lifter having a wide range of usefulness and suitability for use with many different type of batteries.

It is a further object of the invention to provide a battery lifter which is simple in construction, sturdy and which will avoid the necessity for having available at least two different battery lifters.

BRIEF DESCRIPTION OF THE DRAWINGS

The nature and characteristic features of the invention will be more readily understood from the following description taken in connection with the accompanying drawings forming part hereof, in which:

FIG. 1 is a view in perspective showing the battery lifter in accordance with the invention applied to a battery having upright post terminal;

FIG. 2 is a sectional view, enlarged, taken approximately on the line 2—2 of FIG. 1;

FIG. 3 is an exploded perspective view of one of the terminal engaging devices;

FIG. 4 is a view similar to FIG. 1 showing the battery lifter in accordance with the invention applied to a battery having internally threaded terminals in a side wall; and FIG. 5 is a sectional view, enlarged, taken approximately on the line 5—5 of FIG. 4.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings a portion of the case of a storage battery 10 is shown, having a top cover 11 on an outer casing 12, with upright post terminals 13 and 14 extending above the cover 11 for attachment of battery cables (not shown) of conventional type.

The lifter 15, in accordance with the invention includes a lifting and carrying strap 16, for manual engagement, of canvas or duck webbing or of plastic, which is non-conductive of electricity.

The strap 16, at each end, is provided with grips or clamps 17. Each of the grips or clamps 17 is provided with a fixed jaw 18 which has an end plate portion 19 to which a free end of the strap 16 is secured by rivets 20 extending through holes 21 in the plate portion 19 and holes 22 in the strap 16.

The jaw 18 has, extending from the end plate portion 19 at an angle thereto, a jaw plate 24, the end of which preferably has a V-notch 25 at its outer end for gripping engagement with a post terminal 13 or 14.

A stiffening offset 26 can be provided at the junction of the end plate portion 19 and the jaw plate 24.

The end plate portion 19, as seen particularly in FIG. 3, is narrower than the jaw plate 24 for the reception of a movable jaw plate 27. The movable jaw plate 27 has a transverse slot 28 for pivotal mounting on end plate portion 19, the movable jaw plate 27 being retained in place and from displacement by the strap 16.

The movable jaw plate 27 has a central opening 29 bounded by side strip portions 30, an angularly disposed end strip 31 having inwardly extending teeth 32 for gripping engagement with a post terminal 13 or 14 when the V-notch 25 of the jaw plate 24 is also in engagement with the same post terminal 13 or 14.

The jaw plate 24, intermediate its ends has a screw 35 carried thereby. The screw 35 has a threaded shank 36 for engagement in an internally threaded opening 37 in a terminal 38 or 39 in the side wall of the outer casing 12a of a storage battery 10a.

The screw 35 has a reduced neck portion 40, engaged in an opening 41 in the jaw plate 24 and has a knurled head 42 for manual turning of the screw 35 for engagement in or removal from the threaded openings 37.

It will be seen in FIGS. 1 and 2 that the upright post terminals are engaged by the end notch 25 of the jaw plate 24 and the teeth 32 of the jaw plate 27 and that tension applied by the strap 16 tends to increase the gripping and holding action. The screw 35 is so located with its head 42 in the central opening 29 which also accommodates the post terminals 13 and 14 that it does not interfere with the gripping by the jaw plates 24 and 27.

It will be seen in FIGS. 4 and 5 that the shanks 36 of the screws 35, carried by the jaw plate 24 can be engaged in the threaded openings 37 in the respective terminals 38 and 39, jaw plates 24 and 27 remain substantially flat and any pivotal movement of the jaw plate 27 which may occur does not interfere with either the initial mounting, the subsequent lifting or the later removal of the screw 35 from the threaded opening 37.

The strap 16, when used as shown in FIGS. 4 and 5, is tensioned and the battery can be lifted and moved. The battery will tilt to some extent when supported with the strap 16.

We claim:

1. A battery lifter comprising a strap member having end members for selective battery terminal engagement with upright post terminals or with internally threaded side wall carried terminals, said end members including a first jaw member fixedly secured to an end of said strap member and a second jaw member pivotally mounted on said first jaw member for post terminal engagement on opposite sides of a post terminal, one of said jaw members having a central opening for post terminal accommodation bounded at one end by terminal post gripping portions for engagement at one side with the post terminal, the other of said jaw members having a terminal end portion for engagement at the opposite side of the post terminal and a central portion, said other of said jaw members having a screw rotatably carried thereby at said central portion with a threaded shank for internally threaded battery terminal engagement, said screw having an enlarged head for manual engagement extending through said central opening for access.

2. A battery lifter as defined in claim 1 in which said strap member is secured to the end of said other of said jaw members remote from said terminal end portion.

* * * * *